United States Patent
Carroll

(10) Patent No.: US 6,685,140 B2
(45) Date of Patent: Feb. 3, 2004

(54) MINIATURE, UNMANNED AIRCRAFT WITH AUTOMATICALLY DEPLOYED PARACHUTE

(76) Inventor: Ernest A. Carroll, 12913 Alton Square, No. 114, Herndon, VA (US) 20170

( * ) Notice: Subject to any disclaimer, the term of this patent is extended or adjusted under 35 U.S.C. 154(b) by 0 days.

(21) Appl. No.: 10/255,185

(22) Filed: Sep. 26, 2002

(65) Prior Publication Data

US 2003/0057327 A1 Mar. 27, 2003

Related U.S. Application Data

(60) Provisional application No. 60/324,931, filed on Sep. 27, 2001.

(51) Int. Cl.[7] ............................................. B64C 25/56
(52) U.S. Cl. ....................... 244/139; 244/152; 244/149
(58) Field of Search ............................. 244/138 R, 139, 244/140, 141, 147, 148, 149, 150, 152

(56) References Cited

U.S. PATENT DOCUMENTS

| | | | | |
|---|---|---|---|---|
| 3,749,333 A | * | 7/1973 | Lykken et al. | 244/3.15 |
| 4,050,657 A | * | 9/1977 | Murphy | 244/139 |
| 4,709,881 A | * | 12/1987 | Rafikian et al. | 244/17.15 |
| 5,537,909 A | | 7/1996 | Schneider et al. | |
| 5,779,190 A | * | 7/1998 | Rambo et al. | 244/54 |
| 5,836,544 A | * | 11/1998 | Gentile | 244/17.17 |
| 5,921,503 A | * | 7/1999 | Tsay | 244/139 |
| 6,062,176 A | | 5/2000 | Berger | |
| 6,416,019 B1 | * | 7/2002 | Hilliard et al. | 244/139 |
| 6,471,160 B2 | * | 10/2002 | Grieser | 244/139 |

\* cited by examiner

Primary Examiner—Michael J. Carone
Assistant Examiner—Gabriel S. Sukman
(74) Attorney, Agent, or Firm—David L. Banner

(57) ABSTRACT

A miniature, unmanned aircraft having a parachute which deploys automatically under certain conditions. The aircraft has a flight control system based on remotely generated signals, potentially achieves relatively high altitude flight for a remotely controlled aircraft, and can thus operate well beyond line-of-sight control. For safety, an automatically deployed parachute system is provided. The parachute deployment system includes a folded parachute and a propulsion system for expelling the parachute from the aircraft. Preferably, a microprocessor for flight management sends intermittent inhibitory signals to prevent unintended deployment. A deployment signal is generated, illustratively, when the microprocessor fails, when engine RPM fall below a predetermined threshold, and when the aircraft strays from predetermined altitude and course.

9 Claims, 1 Drawing Sheet

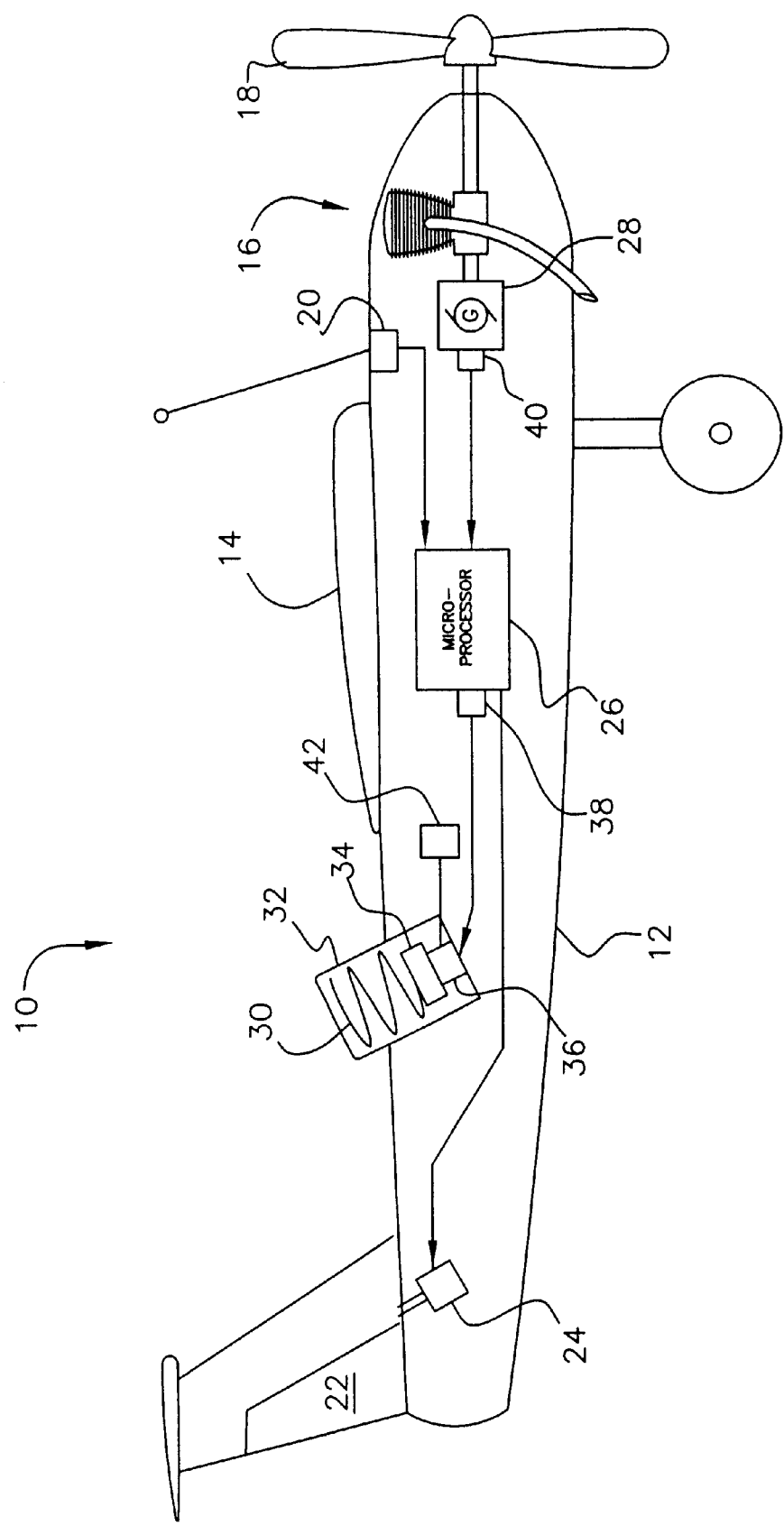

MINIATURE, UNMANNED AIRCRAFT WITH AUTOMATICALLY DEPLOYED PARACHUTE

REFERENCE TO RELATED APPLICATION

This application is related to copending applications respectively entitled UNMANNED AIRCRAFT WITH AUTOMATIC FUEL-TO-AIR MIXTURE ADJUSTMENT, Ser. No. 10/255,184; MINIATURE, UNMANNED AIRCRAFT WITH ONBOARD STABILIZATION AND AUTOMATED GROUND CONTROL OF FLIGHT PATH, Ser. No. 10/255,183; MANUALLY DISASSEMBLED AND READILY SHIPPABLE MINIATURE, UNMANNED AIRCRAFT WITH DATA HANDLING CAPABILITY, Ser. No. 10/255,182; ENGINE DRIVEN SUPERCHARGER FOR AIRCRAFT, Ser. No. 10/255,189; CABLE CONNECTIONS BETWEEN AN UNMANNED AIRCRAFT AND A DETACHABLE DATA HANDLING MODULE, Ser. No. 10/255,187; ELECTRICAL POWER SUPPLY SYSTEM FOR UNMANNED AIRCRAFT, Ser. No. 10/255,188; and MINIATURE, UNMANNED AIRCRAFT WITH INTERCHANGEABLE DATA MODULE, Ser. No. 10/255,186, all filed of even date herewith and which are incorporated herein by reference, and to copending Ser. No. 60/324,931, filed Sep. 27, 2001.

BACKGROUND OF THE INVENTION

1. Field of the Invention

The present invention relates to miniature, unmanned aircraft which are remotely controlled, and more particularly to such aircraft having an on-board parachute and associated deployment system.

2. Description of the Prior Art

Miniature, unmanned aircraft of the type known as "model" aircraft, typically remotely controlled by radio frequency signals, have long been utilized by hobbyists among others. Their practicality has led to suggestions that such aircraft be utilized for data acquisition missions such as remote surveillance. This has traditionally been done by manned conventional aircraft and by satellite. Although both types of platforms are effective, both are quite expensive and limited in their abilities. Miniature, unmanned aircraft would be vastly more practical and lower in cost for most civilian applications.

This has led to remotely controlled model aircraft being suggested for use in aerial data collection. U.S. Pat. No. 6,062,176, issued to Lee Berger on May 16, 2000, and U.S. Pat. No. 5,537,909, issued to Arthur J. Schneider et al., both describe use of model or miniaturized aircraft in data imagery acquisition. Berger's invention is an engine suitable for small aircraft which could be utilized for photoreconnaissance. Schneider et al. utilize a miniature reconnaissance aircraft which is carried to the subject area of interest on another aircraft.

As utilized by hobbyists, model aircraft are controlled on a visual line-of-sight basis, and are flown in most cases on courses dedicated to use of model aircraft by those having experience and familiarity with miniature aircraft. Expansion of the use of miniature, unmanned aircraft over areas not solely dedicated to such aircraft introduces concerns for safety. Because many if not almost all model aircraft are capable of considerable airspeeds, some attaining close to two hundred miles per hour, it will be appreciated that a parachute system for slowing an aircraft which is no longer under close control of the operator would be highly advisable.

Neither Berger nor Schneider addresses the need for parachutes. There exists a need to provide miniature, unmanned aircraft suitable for use in collection of aerial data in commercial and other civil applications with an automatically deployed parachute system.

SUMMARY OF THE INVENTION

The present invention improves upon small scale, unmanned aircraft used in hobby flight, reconnaissance, and in image acquisition. Model aircraft and other miniature, unmanned aircraft are typically light enough to avoid the fifty-five pound limit which is a threshold above which severe restrictions on use of an aircraft are imposed. As employed herein, a miniature aircraft will be understood to be of dimensions too small to accommodate a human occupant who is capable of controlling the flight.

It would greatly reduce costs and increase practicality to perform certain tasks with miniature, unmanned aircraft. Miniature aircraft cost less to purchase, maintain, and operate than full size aircraft which accommodate human occupants. Also, they are not restricted as to storage, take off or launch, and areas of operation. As an illustration of the latter condition of operation, it is noted that miniature aircraft are not restricted as regards being allowed to overfly certain types of facilities. Full size aircraft are, for example, banned over certain populated facilities, and require runways of great length to take off.

However, noting the speeds attainable by miniature aircraft, the present invention seeks to provide miniature aircraft both with parachutes and also with an automatic deployment system which can deploy a parachute in certain predetermined situations. Such a system not only promotes public safety, but also has the potential to promote public perception of increased safety. The latter will lead to greater public acceptance of miniature aircraft as utilized away from small, dedicated courses, thereby promoting the many benefits which can be realized by miniature aircraft.

Accordingly, it is an object of the invention to provide an automatically deployed parachute for miniature aircraft which is inexpensive, dependable and fully effective in accomplishing its intended purposes.

Another object is to promote both public safety and also public perception of safety.

These and other objects of the present invention will become readily apparent upon further review of the following specification and drawings.

BRIEF DESCRIPTION OF THE DRAWING

Various other objects, features, and attendant advantages of the present invention will become more fully appreciated as the same becomes better understood when considered in conjunction with the accompanying drawing, which is a diagrammatic, side elevational view of one embodiment of an aircraft according to the present invention.

DETAILED DESCRIPTION OF THE PREFERRED EMBODIMENTS

The drawing figure shows a miniature, unmanned, remotely guided or controlled aircraft 10 having an automatic parachute deployment system according to the present invention. Aircraft 10 is too small to accommodate an adult human operator, and preferably weighs less than fifty-five pounds. Particularly addressing civilian uses in the United States, it is highly desirable to have an unmanned aircraft which is light enough to avoid the fifty-five pound limit which is a threshold above which severe restrictions on use of an aircraft are imposed. Aircraft 10 has an airframe including a fuselage 12 and a wing 14 for developing lift, and has a reciprocating piston internal combustion engine 16 drivably connected to a propeller 18. A radio frequency receiver 20 is disposed to receive remote guidance signals.

Aircraft 10 has a flight control system disposed to control direction of flight responsive to the remote guidance signals. The flight control system includes a flight control element comprising at least one of the group including rudder, elevator, flaps, and ailerons. The flight control system also includes servomechanisms for driving the rudder, elevator, flaps, and ailerons. These control components are shown symbolically as rudder 22 and servomechanism 24. The control components and their associated servomechanisms may be generally similar to those employed for so called "model" aircraft.

Unlike most model aircraft flown by hobbyists and for simulation in movie making, aircraft 10 has a microprocessor 26 for managing flight control by sending control signals to servomechanism 24 and for performing other supervisory tasks. Radio receiver 20 is communicably connected to microprocessor 26. An engine driven generator 28 provides electrical power for operating microprocessor 26 and all other electrically operated devices such as receiver 20 and servomechanism 24 either directly or indirectly through a battery (not shown).

A parachute 30, shown folded and contained within a receptacle 32, is carried aboard the airframe in any suitable location. Parachute 30 will be understood to include a sturdy tether (not shown) anchored to the airframe, and is preferably of sufficient size and configuration as to be able to slow aircraft 10 to a speed not exceeding approximately sixteen feet per second. A deployment system is disposed to deploy parachute 30 under at least one predetermined condition. The deployment system includes a parachute deployment mechanism such as pyrotechnic device 34 operated by an ignitor 36. Pyrotechnic device 34 may be similar to those employed to operate automotive airbags used for passenger restraint in the event of collision. Pyrotechnic device 34 may optionally include or omit a flexible bag (not separately shown) for enclosing gas generated by operation. Ignitor 36 is operated by an electrical signal originating at microprocessor 26 or alternatively, at a microprocessor subsystem 38, as will be explained hereinafter.

At least one sensor is provided and is disposed to sense a threshold value of at least one operational parameter of flight upon which a decision to deploy parachute 30 is based. That sensor or another sensor causes the parachute deployment mechanism (in the embodiment shown in FIG. 1, this being pyrotechnic device 34 and ignitor 36) to operate. Although a sensor may act directly on the parachute deployment mechanism, thereby bypassing microprocessor 26, it is preferred to utilize microprocessor 26 to manage the deployment process and to generate the necessary signal to ignitor 36 if microprocessor 26 also manages flight. When microprocessor 26 manages both flight and also parachute deployment, microprocessor 26 causes the deployment mechanism to operate responsive to sensing when a sensed threshold value falls below or above a predetermined magnitude, or otherwise is outside a predetermined acceptable range of values.

For example, the decision to deploy parachute 30 may be based on engine failure. A tachometer 40 monitors generator 28 and transmits a data signal indicative of sensed engine speed to microprocessor 26. Microprocessor 26 will be understood to include memory and programming (neither shown) which include a predetermined minimum engine speed threshold value. Microprocessor is programmed to compare data received from sensor 40 with threshold values stored in memory. Should the engine speed, typically reported as revolutions per minute of the crankshaft (not separately shown), fall below the minimum threshold value stored in memory, it may be inferred that the engine has failed, and a deployment decision is made responsively by microprocessor 26. In the example just described, engine speed is the monitored operating parameter.

Operation of microprocessor 26, when the latter manages flight, as occurs in the preferred embodiment, is also selected as an operating parameter. In this case, microprocessor periodically or continuously generates a deployment inhibition signal. The inhibition signal is monitored by subsystem 38. In the event that the inhibition signal is absent for a predetermined time interval, failure of microprocessor 26 may be inferred, and subsystem 38 generates a deployment signal. When subsystem 38 operates in the fashion described, then microprocessor 26 may generate a deployment signal responsive to sensor 40 by discontinuing the inhibition signal. Subsystem 38 may be regarded as a sensor which monitors successful operation of microprocessor 26. Subsystem 38 is arranged to operate in a "dead man" or fail safe mode assuring that the decision to deploy parachute 30 not be dependent on a component which itself could conceivably fail.

The fail safe mode may be realized by providing a secondary or dedicated battery 42, and connecting power of both generator 28 (or its associated principal battery) and also battery 42 to ignitor 36 through normally closed contacts of a relay (not shown) the coil of which is normally energized during flight operation such that the normally closed contacts are open during flight.

Thus a plurality of sensors may be provided, each of which is disposed to monitor and communicate a different operational parameter of flight, with the deployment signal being based on either monitored parameter. Obviously, additional criteria for deploying parachute 30 may be invoked.

It will be recognized that the role of microprocessor 26 may be restricted if desired. For example, flight control components such as rudder 22 and its associated servomechanism 24 could be operated directly from radio receiver 20, thereby bypassing microprocessor 26, the latter managing the parachute deployment system only. Alternatively, the parachute deployment system could be arranged to respond directly to a sensor and thereby bypass microprocessor 26. In such case, deployment threshold recognition would be inherent in or contained within the controlling sensor or sensors, or some intermediary device acted on by the sensor or sensors. It is possible that no microprocessor be provided, or alternatively that a microprocessor be provided but assume a role unrelated either to flight management or to parachute deployment. An example of the latter is to use a microprocessor in managing an image acquisition system (not shown) carried aboard the aircraft.

The deployment system could be based on any system which determines that control of the aircraft is lost or that flight departs from intentional characteristics. For example, should the aircraft exceed a maximum or minimum altitude, an altimeter or other sensor could cause the microprocessor to generate the deployment signal. Should the aircraft stray from a pre-established course, then a received GPS signal which reveals a position deviating within predetermined tolerances of an instructed flight path may be utilized to generate the deployment signal.

It is also possible to generate a deployment signal upon a specific command to do so transmitted from the ground. Such a command may operate the parachute deployment system directly or alternatively, through microprocessor 26.

The system is arranged to prevent deployment under certain circumstances. For example, on final landing approach or upon landing, it may be desirable to inhibit parachute deployment.

The invention is susceptible to other variations and modifications which may be introduced thereto without departing from the inventive concept. For example, the system comprising pyrotechnic device 34 and ignitor 36 may be replaced by another system achieving a similar function. Illustratively, a pre-compressed elastomeric spring and an associated release device (neither shown) could be provided to deploy parachute 30. In still another example, a reservoir containing a compressed gas could be utilized in place of pyrotechnic device 34.

It is to be understood that the present invention is not limited to the embodiments described above, but encompasses any and all embodiments within the scope of the following claims.

I claim:

1. A miniature, unmanned, remotely controlled aircraft, comprising:
    an airframe,
    a reciprocating piston internal combustion engine,
    a receiver disposed to receive remote guidance signals,
    a flight control system disposed to control direction of flight responsive to the remote guidance signals,
    a parachute carried aboard said airframe, and
    a deployment system operatively connected to said parachute and disposed to deploy said parachute said deployment system comprising:
        a parachute deployment mechanism,
        at least one sensor disposed to sense a value of at least one operational parameter of flight operatively connected to said deployment mechanism, and
        a fail-safe system comprising means for generating a fail-safe signal indicative of normal operation of at least said flight control system and means for sensing presence of said fail-safe signal operatively connected to said deployment mechanism,
    said deployment mechanism being caused to operate responsive to at least one of the conditions: sensing when the sensed value falls outside a predetermined range of acceptable values, and sensing an absence of said fail-safe signal for a predetermined period of time.

2. The miniature, unmanned, remotely controlled aircraft according to claim 1, wherein said sensor comprises a plurality of sensors each disposed to monitor and communicate different operational parameters of flight.

3. The miniature, unmanned, remotely controlled aircraft according to claim 1, wherein said parachute deployment system further comprises a microprocessor disposed to manage deployment of said parachute and an electrical power source operably connected to said microprocessor, wherein
    said sensor is communicably connected to said microprocessor so as to be able to transmit data corresponding to a value of said at least one operation parameter of flight, and
    said microprocessor has a memory and is provided with programming which programming compares data received from said sensor with threshold values stored in said memory, generates a deployment signal responsive to determining that a sensed threshold falls outside a predetermined range of acceptable values stored in said memory, and transmits said deployment signal to said parachute deployment mechanism.

4. The miniature, unmanned, remotely controlled aircraft according to claim 3, wherein
    said aircraft has a flight direction element;
    said microprocessor is disposed to manage flight of said aircraft by controlling said flight direction element and includes a microprocessor subsystem including memory and programming disposed to transmit an inhibition signal to said parachute deployment system; and
    said parachute deployment system is disposed to deploy said parachute in the absence of said inhibition signal for a predetermined time interval.

5. The miniature, unmanned, remotely controlled aircraft according to claim 3, wherein
    said sensor comprises an engine speed sensor disposed to sense engine rotational speed and is communicably connected to said microprocessor to transmit engine rotational speed data to said microprocessor,
    said microprocessor comprises memory and programming disposed to compare sensed engine rotational speed to a predetermined threshold of engine rotational speed, and said microprocessor is disposed to transmit a deployment signal when sensed engine rotational speed falls below the predetermined threshold of engine rotational speed.

6. The miniature, unmanned, remotely controlled aircraft according to claim 3, wherein said sensor is disposed to monitor and communicate different operational parameters of flight, wherein
    said microprocessor is disposed to manage flight of said aircraft, and includes a microprocessor subsystem including memory and programming disposed to transmit an inhibition signal to said parachute deployment system;
    said sensor comprises at least an engine speed sensor disposed to sense engine rotational speed and is communicably connected to said microprocessor to transmit engine rotational speed data to said microprocessor, and said microprocessor subsystem includes memory and programming disposed to compare sensed engine rotational speed to a predetermined threshold of engine rotational speed; and
    said parachute deployment system is disposed to deploy said parachute in the absence of said inhibition signal for a predetermined time interval and also when sensed engine rotational speed falls below the predetermined threshold of engine rotational speed.

7. The miniature, unmanned, remotely controlled aircraft according to claim 1, wherein said deployment system comprises an actuator disposed to respond directly to a remotely generated intentional command signal transmitted from the ground to deploy said parachute.

8. The miniature, unmanned, remotely controlled aircraft according to claim 1, wherein said at least one sensor is disposed to deploy said parachute when said aircraft strays from a pre-established course.

9. The miniature, unmanned, remotely controlled aircraft according to claim 1, wherein said at least one sensor is disposed to deploy said parachute when said aircraft departs from a pre-established altitude.

* * * * *